March 19, 1968    J. R. WELLS    3,373,463
MOLDING CLIP
Filed April 25, 1966
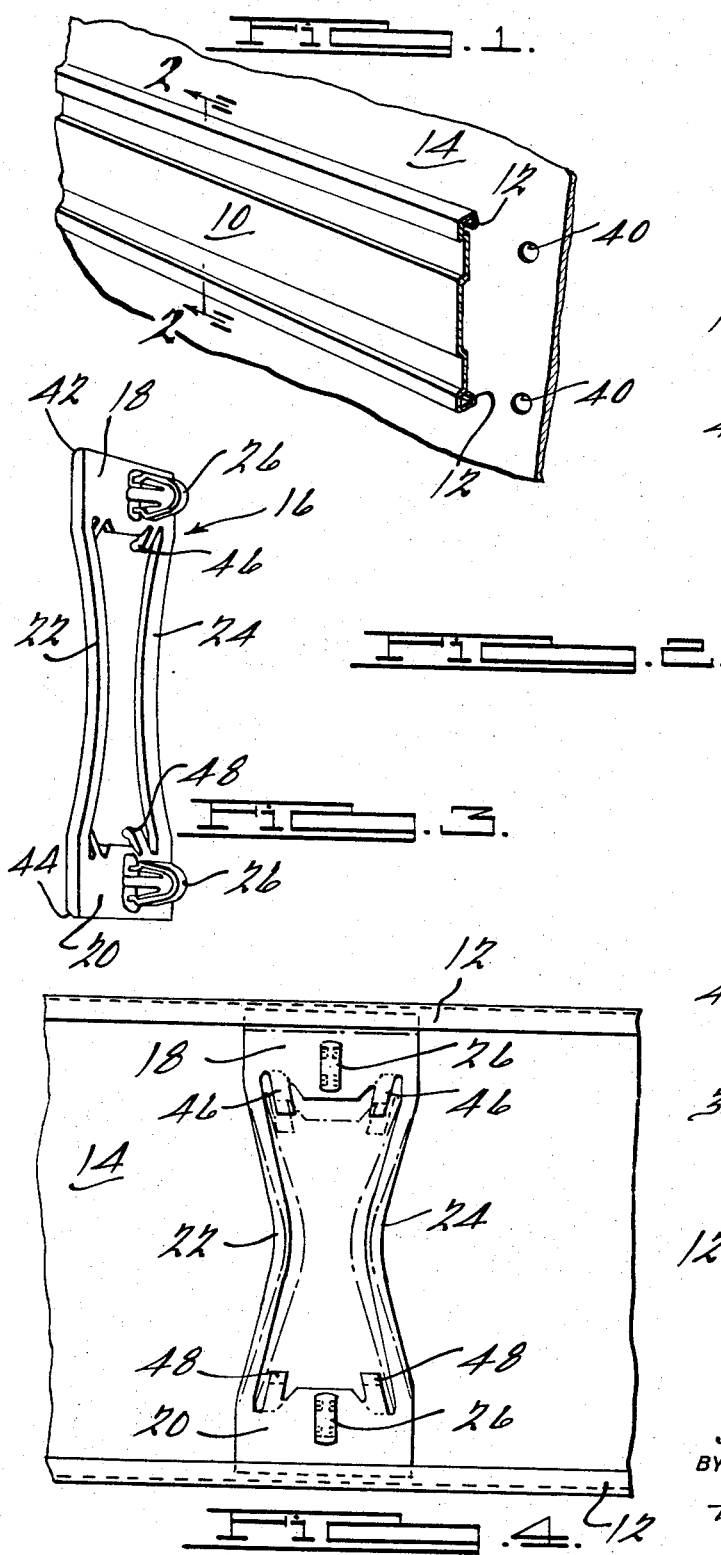
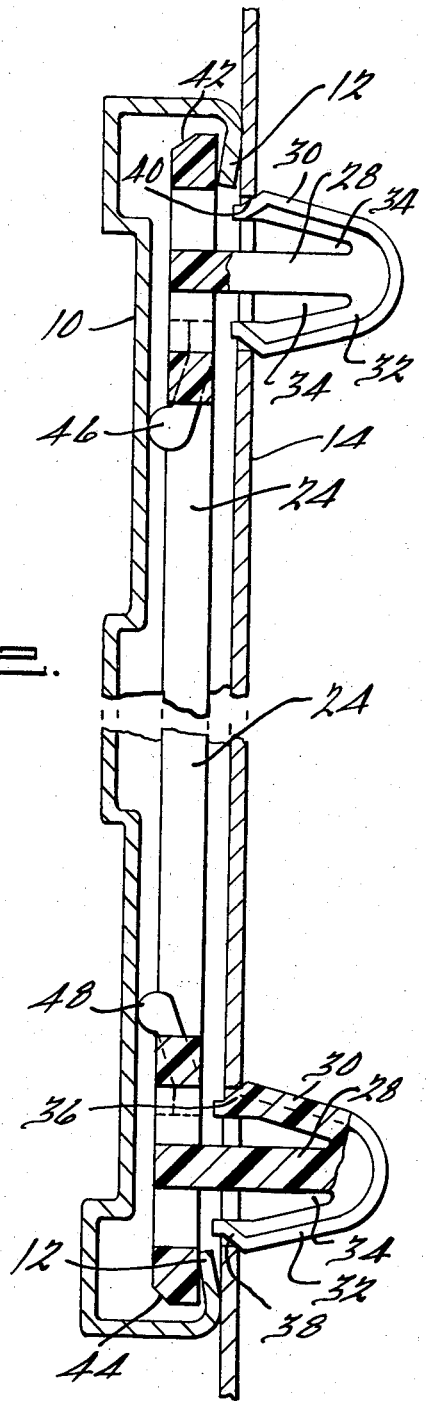
INVENTOR.
John R. Wells
BY
Harness and Harris
ATTORNEYS.

United States Patent Office 3,373,463
Patented Mar. 19, 1968

3,373,463
MOLDING CLIP
John R. Wells, Detroit, Mich., assignor to Chrysler Corporation, Highland Park, Mich., a corporation of Delaware
Filed Apr. 25, 1966, Ser. No. 545,104
4 Claims. (Cl. 24—73)

ABSTRACT OF THE DISCLOSURE

A clip for securing a trim panel or the like to a base member. The clip is a thin flat body member having an attaching prong at each end portion of the body with the end portions being interconnected by one or more spaced flexible strut like members. The strut member is capable of flexing in the plane of the body so as to enable the spacing between the prongs to be easily varied and at the same time retain the original flat silhouette of the clip.

---

This invention pertains to an improved molding fastener of the type for attaching a trim molding or the like to a panel structure or base member which may be part of an automobile, boat, air conditioner or similar article of commerce.

It is common manufacturing practice to trim an article by mounting a decorative strip thereon by means of clips which are in turn affixed to the article. Such clips are frequently secured to the base member panel by locking means on the clip penetrating a single aperture that is drilled or pierced in the panel. Moreover, in many instances it is desirable to employ a clip having two or more spaced locking means respectively secured in two or more panel apertures. This construction is particularly advantageous where the trim molding to be supported is heavy or wide. However, while clips having more than one locking means or prong have proved satisfactory with respect to their support of the trim molding, a serious problem is often encountered in securing the clip itself to the panel or base member. This problem is presented by the fact that the plural locking means of the clip may not register with the holes that have previously been formed in the base panel. The cause of such misalignment can generally be attributed to wear that develops in the drilling or piercing apparatus that is employed to form the holes, such wear causing the distance between holes to vary. Likewise, variations in metal compositions as between panels or changes in atmospheric conditions at the time the base panels are formed or machined may give rise to dimensional variations. Naturally, the dimensions of the molding clip are also subject to fluctuation thereby increasing the probability of misalignment. Obviously, such misalignment is incompatible with production assembly and results in a decrease in both the quality and quantity of end items.

Accordingly, it is an object of this invention to provide a new and improved molding clip adapted to secure a molding or the like to an apertured support.

Another object is to provide a simple fastening device, preferably of one piece construction, which has an improved construction for ease of assembly of the fastener to a panel.

A further object is to provide a molding clip which can be easily distorted so that spaced locking portions of the clip will move relative to each other to more readily register with panel apertures and thereby facilitate attachment of the clip to a base panel.

Yet another object is to provide a molding clip having an elastic portion that can be flexed by hand so as to move the panel engaging portions of the clip relative to each other.

According to the present invention, a molding clip is provided which has prongs or retaining projections formed on opposite ends of the clip for cooperation with spaced apertures in the base panel. In addition, the clip end portions are shaped to cooperate with the edges or other clip engaging portion of a trim molding. Accordingly, the clip prongs urge the molding toward the base panel to provide a rattle free assembly and maximum "pull down" of the molding edges with respect to the base panel. The end portions of the clip are joined together or interconnected by means of at least one member which is made from a flexible material. Preferably, the flexible portion of the clip comprises at least one strut member which when unstressed is slightly bowed so that the distance between the end portions of the clip can either be increased or decreased by merely bending the strut member. Since each of the end portions is provided with at least one retaining prong, this flexing feature allows the clip to be secured to a panel having tandem attaching holes of varying center distances.

Another principal advantage of the clip is that it permits a trim molding to be attached to the clip more quickly with much greater ease and convenience. Thus, with conventional clips it is generally necessary to either insert the clip engaging portion of the trim molding about the clip and then slide the clip along the molding to the desired position, or to provide notches at intervals in the curled edge or flange portion of the molding whereby the clip can be introduced to the molding at a point close to the final desired clip location. In the arrangement of this invention, however, the strut portion of the clip can be flexed so as to sufficiently foreshorten the clip thereby allowing its end portions to clear the molding flanges and drop into the molding at the desired locations.

The above and other objects, features and advantages of this invention will be apparent from the following detailed description of a preferred embodiment of the invention and from the accompanying drawing wherein:

FIGURE 1 is a perspective view showing a trim molding fastened by the clip (not shown) of this invention to a base panel which has been provided with tandem openings by which the clip can be attached to the panel.

FIGURE 2 is a partial sectional view taken along the line 2—2 of FIGURE 1;

FIGURE 3 is a perspective view of the molding clip of this invention; and

FIGURE 4 is an elevational view showing a trim molding attached to the molding clip of this invention and showing in phantom lines the positions of various portions of the clip when the strut members are bent so as to alter the distance between the prongs of the clip.

A molding strip 10 having clip engaging means as exemplified by inturned flanges 12 is secured to a base member 14 by the molding clip of fastener 16 of this invention. The clip 16 is preferably fabricated from any suitable plastic such as nylon, cellulose acetate butyrate, polycarbonate and polyvinyl chloride, or rubber material which thereby substantially eliminates the possibility of scratching the paint surface of the base panel and also eliminates much of the rusting which is associated with trim strip mounting assemblies.

Clip 16 has generally rectangular shaped end portions 18 and 20 which are longitudinally spaced apart and interconnected by strut members 22 and 24 which are preferably composed of an elastic material. For simplicity, the strut members 22, 24 are preferably integrally formed with the clip end portions 18 and 20 as seen in FIGURES 3 and 4, which also permits complete fabrication of the clips by economical stamping or molding processes. It will also be noted that clip 16 can assume various shapes since strut members 22, 24 can be bent so as to conform with and lie against any undersurface without impairing their ability to alter the longitudinal distance between the end portions of the clip. Thus, as seen in FIGURE 4, the strut members 22, 24 are moved in a direction transverse to the longitudinally spaced end portions in order to change the longitudinal distance between the end portions. Accordingly, the silhouette of the clip viewed edgewise does not change when the distance between the end portions thereof is varied since the strut members move in a direction generally normal to the direction of movement of the end portions. This is desirable since the clip will not project outwardly to any appreciable extent from the base panel and, therefore, will not necessitate the use of trim moldings of arcuate cross-section in order to accommodate the clip. Likewise, the clip can, for example, be given a generally C shape silhouette for attachment to a similar shaped curvilinear surface or an L shape for attaching corner trim moldings where one of the cooperating attachment openings in the base panel is formed in each of the intersecting planes of the corner.

As seen with reference to FIGURES 3 and 4, the strut members 22, 24 each have an arcuate or bowed configuration which permits the distance between the end portions of the clip to be increased or decreased. Thus, if the strut members 22, 24 are squeezed inwardly or toward each other the end portions 18 and 20 of the clip will be drawn closer together. This condition is illustrated by phantom lines in FIGURE 4. Similarly, if the strut members are bent in the opposite direction so as to be straightened, the distance between the end portions 18, 20 is increased. It will be understood, of course, that the strut members 22 and 24 would be equally effective in changing the distance between the end portions if they were fabricated so as to be bowed in the opposite direction from that illustrated, that is, so the distance between the struts is greater at the center of the clip than at its end portions.

Each of the clip end portions 18 and 20 is provided with at least one clip retaining projection or prong 26 extending outwardly from one side of the clip. While no particular prong structure is required for the successful use of the clip of this invention, excellent results have been obtained from a prong consisting of a shank portion 28 extending outwardly from the end portion (FIGURE 2) for insertion through an aperture or opening in a base panel. Adjacent the free or entering end of the shank 28, oppositely disposed flexible wing members 30 and 32 are integrally joined to opposite sides of the shank 28. The wing members 30, 32 extend back toward the end portion of the clip and are flared outwardly so as to provide spaces 34 between the wing members and the shank. Accordingly, during insertion of the prong the wing member can flex inwardly so as to allow passage of the prong. Since the prongs are preferably integrally formed with the head portions of the clip and are of an elastic material, the wing members 30, 32 inherently flare outwardly and thereby engage the base panel as on the surface of the inturned extremities 36 and 38 of wing members 30, 32, respectively.

The clip of this invention finds special application in securing to base panels, moldings which are of substantial width and/or weight. FIGURE 1 illustrates such a situation in which a relatively wide molding is secured to a panel. In this instance, tandem or vertically aligned openings 40 are provided in the panel 14. This is a highly desirable arrangement since, as seen with respect to FIGURE 2, when the prongs 26 of the clip are inserted into the opening 40, both the upper and lower portions of the clip are securely anchored with respect to the panel. Accordingly, this arrangement provides for maximum "pull-down" of the trim molding in the direction of the base panel thereby preventing rattle, as well as improving the appearance of the molding. However, although the use of tandem openings is desirable their use is frequently avoided due to difficulties as discussed above in aligning the clip prongs with the panel openings. Such alignment problems are now overcome by the clip disclosed herein. For example, if the distance between the openings 40 in panel 14 is less than that between the prongs 26 of clip 16, the strut members 22 and 24 can be squeezed together as shown in FIGURE 4 thereby bringing the end portions 18, 20 closer to each other and carrying prongs 26 into alignment with the openings 40. Similarly, if the distance between the openings 40 in the panel is greater than the distance between the prongs of the clip, the elastic struts 22, 24 can be straightened from their bowed configuration thereby increasing the distance between the clip end portions 18, 20. Preferably, the struts 22, 24 can be bent or flexed by hand and, accordingly, the clip can also be attached to the base panel by inserting one of the prongs 26 into an opening 40 and then supplying a force on the clip to enter the free end of the other prong into the other opening.

After the clip 16 is mounted on the base panel 14 the molding trim strip 10 is generally assembled to the clip by first moving one of the curled edges or inturned flanges 12 over one of the clip shoulders 42 or 44 after which the other edge of the strip is snapped over the other clip shoulder. In the illustrated embodiment, the shoulders 42, 44 are located on the clip end portions 18 and 20, respectively, and extend normal to the longitudinal axis of the clip. It will be apparent, of course, that the trim molding engaging shoulders of the clip could be provided on the clip end portion edges which extend parallel to the longitudinal axis of the clip. This latter arrangement would be employed, for example, if it was desired to mount a relatively narrow trim molding. In this case the longitudinal axis of the molding and clip would be generally parallel and the openings in the base panel would lie beneath the longitudinal axis of the molding.

As mentioned above, trim moldings have heretofore been mounted by engaging one end of the molding with the clip and then sliding the molding past the clip until that end reached a second clip, whereupon the engaging and sliding process was repeated. This is a time consuming process and, accordingly, trim moldings are frequently provided with notches or slots in the edge or flange portion thereof which will permit clips to be inserted into the molding at various positions. This technique, however, has disadvantages in that providing such notches adds to the cost of the molding and frequently creates sharp edges which cause a handling problem. The shortcomings of both of the above assembly methods however, are overcome through use of the clip of this invention. For example, the clip as seen in FIGURE 4, can be dropped directly into the trim molding by squeezing the strut members 22 and 24 so as to foreshorten the clip and allow shoulders 42 and 44 on end portions 18 and 20 to clear the molding flanges 12. Furthermore, in the preferred embodiment, the strut members automatically, upon being released, urge the end portions of the clip into engagement with the molding flanges due to their elastic nature.

In order to insure during service that the flanges 12 of molding 10 remain in tight contact with the shoulders 42, 44 of clip 16, and to restrain the molding from sliding with respect to the clip, finger-like members or tabs 46 and 48 are formed on the clip end portions 18 and 20, respectively, and extend outwardly therefrom in a direction opposite from that of prongs 26 so as to be in engageable relationship with the inner surface of trim molding 10.

From the foregoing discussion it is apparent that the objects of this invention have been obtained. A simple, economical molding clip has been provided which can be shortened or lengthened almost instantly without the use of tools. Accordingly, the clip can be quickly and easily connected to a base panel in which the mounting apertures are of varying center distances.

I claim:
1. A clip for securing a molding clip to a base member having a plurality of openings, said clip comprising a body having opposite end portions each of which being provided with at least one prong, each of said prongs being capable of extending through one of said openings in said base member, said end portions of said clip lying in substantially one plane and each having a portion engageable with said molding strip for cooperatively securing said molding strip to said clip and at least one finger-like member extending generally outwardly from said end portion in a direction opposite from that of said prong for engaging a portion of said strip, and said end portions being interconnected and longitudinally spaced from each other by flexible means, said flexible means being effective upon movement of at least a portion thereof in a direction transverse to said longitudinally spaced end portions for varying the longitudinal distance between said end portions while maintaining said end portions in said one plane.

2. A clip for securing a molding strip to a base member having a plurality of openings, said clip comprising a body having opposite end portions each of which being provided with at least one prong, each of said prongs being capable of extending through one of said openings in said base member, said end portions of said clip having a portion engageable with said molding strip for cooperatively securing said molding strip to said clip and said end portions being interconnected and longitudinally spaced from each other by two generally elastic strut members which are integral with said end portions, said strut members normally being spaced apart and bowed such that the distance between the struts at the center of the clip is different from the distance between the extremities of the struts, said strut members being effective upon movement of at least a portion thereof in a direction transverse to said longitudinally spaced end portions for varying the longitudinal distance between said end portions.

3. A clip for securing a molding strip to a base member having a plurality of openings, said clip comprising a body having opposite end portions each of which being provided with at least one prong, each of said prongs being capable of extending through one of said openings in said base member, said end portions of said clip each having a portion engageable with said molding strip for cooperatively securing said molding strip to said clip, flexible means interconnectng said end portions and spacing them longitudinally from one another, at least one of said end portions lying generally in a first plane and said prongs lying generally in a second plane which is substantially normal to said first plane, said flexible means being effective upon movement of at least a portion thereof in a direction generally normal to said second plane to vary the longitudinal distance between said end portions.

4. A clip according to claim 3 wherein said end portions and said flexible means lie substantially in said first plane and the longitudinal distance between said end portions is varied by moving said flexible means within said first plane.

References Cited
UNITED STATES PATENTS

| | | | |
|---|---|---|---|
| 3,242,543 | 3/1966 | Adams | 24—73 |
| 2,147,943 | 2/1939 | Churchill | 24—73 |
| 2,948,368 | 8/1960 | Arnold | 24—73 |
| 3,049,781 | 8/1962 | Cochran | 24—73 |

OTHELL M. SIMPSON, *Primary Examiner.*

WILLIAM FELDMAN, *Examiner.*

G. WEIDENFELD, *Assistant Examiner.*